(No Model.)

E. C. NEWTON.
TELEPHONE.

No. 375,456. Patented Dec. 27, 1887.

ATTEST:
J. A. Mundle
John P. Wright.

INVENTOR:
Edward C. Newton

By Edward P. Thompson
Attorney

UNITED STATES PATENT OFFICE.

EDWARD C. NEWTON, OF LITTLE ROCK, ARKANSAS.

TELEPHONE.

SPECIFICATION forming part of Letters Patent No. 375,456, dated December 27, 1887.

Application filed February 24, 1887. Serial No. 228,695. (No model.)

*To all whom it may concern:*

Be it known that I, EDWARD C. NEWTON, a citizen of the United States and a resident of Little Rock, county of Pulaski, and State of Arkansas, have invented certain new and useful Improvements in Telephones, of which the following is a specification.

My invention relates to a magneto electric telephone provided with multiple armatures, all connected to a common diaphragm.

The object of the invention is to provide superior means for obtaining amplified electric undulations when used as a transmitter and increased acoustic effects when employed as a receiver.

Figure 2:
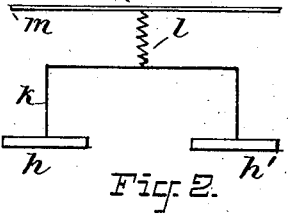
Figure 1:
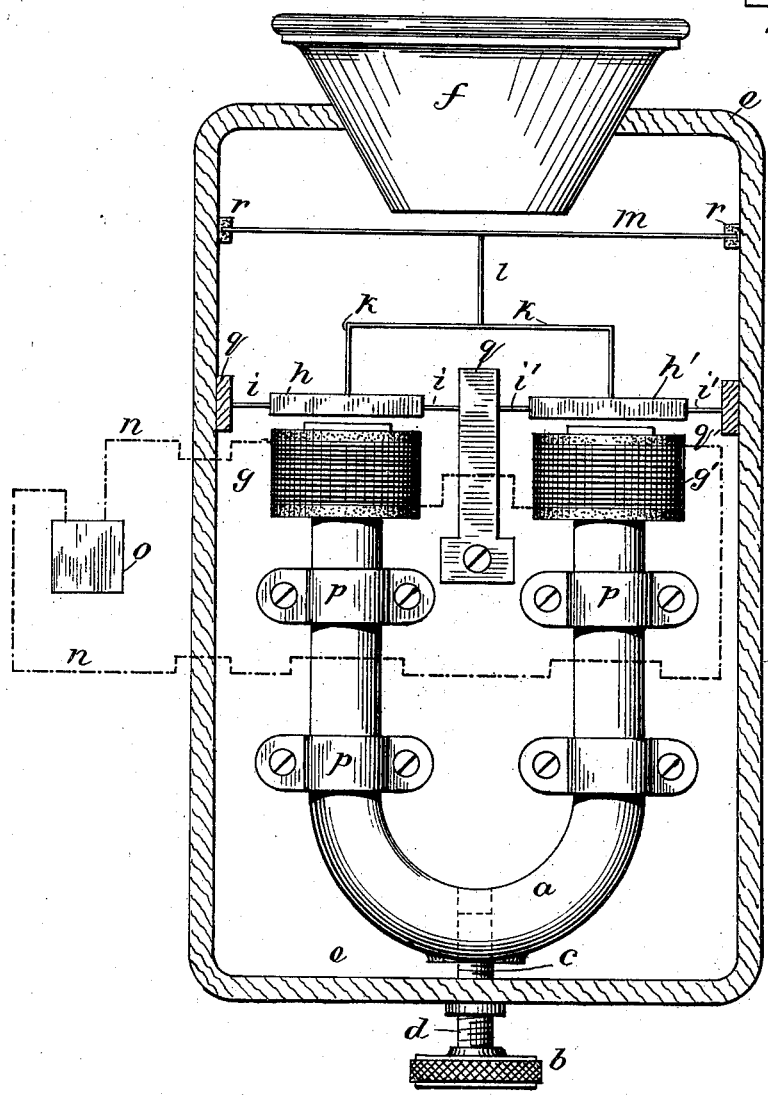

In the drawings, Figure 1 is a general view of the parts comprising my invention, shown partly in cross-section; and Fig. 2 shows an elastic connection between the diaphragm and the armatures.

The device consists of the combination of a horseshoe permanent magnet, $a$, movable in the direction of the axes of its arms, an adjusting-screw, $b$, for said magnet, having threads $c$ in one direction entering the magnet and other threads, $d$, in the opposite direction passing into a fixed support, $e$, which also serves as a support for the mouth-piece $f$, solenoids $g$ and $g'$, located upon the extremities of said magnet, armatures $h$ and $h'$ for the poles of said magnet, independent elastic supports $i$ and $i'$ for the armatures, a rigid connection, $k$, between the armatures, and a suitable connection, $l$, between the said rigid connection and the diaphragm $m$ of said telephone, the said solenoids being in series with each other in an electric circuit, $n$, including any suitable telephonic apparatus.

The *modus operandi* is substantially the same as in other telephones.

When acoustic vibrations act upon the diaphragm $m$, its vibrations are communicated, through the connection $l$ and the connection $k$, to the armatures $h$, which, being thus given an oscillatory motion, cause an undulatory current, which may be transformed into acoustic vibrations by means of a similar or other instrument, $o$.

The screw $b$ serves as a means of adjusting the magnet $a$ at the most effective distance from the armatures $h$ and $h'$. The solenoids are wound with wire in opposite directions. The magneto-telephone at the other end of the line sends alternating currents, so that the poles of the receiving-magnet are alternately strengthened and weakened.

The letters $p$ represent fixed bearings in which the magnet is adapted to slide when adjusted by the screw $b$.

The parts $q$ represent supports for the elastic connections $i$ and $i'$.

$r$ represents the supports of the diaphragm $m$.

It will be noticed from the drawings that the armatures are vibratory in parallel planes, thereby giving them a vibration which conforms more accurately to the undulatory movements of the air or of the electric current.

I claim as my invention—

In a magneto-telephone, the combination of a horseshoe permanent magnet, coils upon the poles of the magnet in a suitable electric circuit, an armature for each pole, an elastic support for each armature, all the elastic supports being independent of each other, a rigid connection between the armatures, and a suitable diaphragm for the telephone, an elastic connection being provided between the said rigid connection and the said diaphragm.

In testimony that I claim the foregoing as my invention I have signed my name, in presence of two witnesses, this 19th day of February, 1887.

EDWARD C. NEWTON.

Witnesses:
W. H. CORNWALL,
C. ANDERSON.